United States Patent
Uensal et al.

(10) Patent No.: US 7,881,885 B2
(45) Date of Patent: Feb. 1, 2011

(54) METHOD AND DEVICE FOR DETERMINING THE INSTANTANEOUS MASS FLOW OF PULSATING FLOWS

(76) Inventors: Buelent Uensal, Wichernstrasse 18, 91058 Erlangen (DE); Dimosthenis Trimis, Hornschuchpromenade 17, 70962 Fuerth (DE); Franz Durst, Elchenstrasse 12, 91094 Langensendelbach (DE)

( * ) Notice: Subject to any disclaimer, the term of this patent is extended or adjusted under 35 U.S.C. 154(b) by 362 days.

(21) Appl. No.: 11/922,215

(22) PCT Filed: Jun. 16, 2006

(86) PCT No.: PCT/EP2006/005817

§ 371 (c)(1),
(2), (4) Date: Jun. 6, 2008

(87) PCT Pub. No.: WO2006/133963

PCT Pub. Date: Dec. 21, 2006

(65) Prior Publication Data

US 2009/0312962 A1 Dec. 17, 2009

(30) Foreign Application Priority Data

Jun. 17, 2005 (DE) .................... 10 2005 028 457
Jun. 24, 2005 (DE) .................... 10 2005 029 713

(51) Int. Cl.
*G06F 19/00* (2006.01)
*G01F 1/00* (2006.01)

(52) U.S. Cl. .................................... 702/47; 123/494
(58) Field of Classification Search .............. 702/47, 702/50; 123/478, 494
See application file for complete search history.

(56) References Cited

U.S. PATENT DOCUMENTS

| 5,228,336 | A | 7/1993 | Nagaishi |
| 6,510,842 | B2 | 1/2003 | Ismailov |
| 6,874,489 | B2 * | 4/2005 | Yonekawa et al. ......... 123/661 |
| 2002/0014224 | A1 * | 2/2002 | Ismailov ................... 123/494 |

OTHER PUBLICATIONS

S. Ray et al; "Mass Flow Rate Controlled Fully Developed Laminar Pulsating Pipe Flows" Journal of Fluids Engineering, vol. 127, May 2005, pp. 405-418.

* cited by examiner

*Primary Examiner*—Bryan Bui
(74) *Attorney, Agent, or Firm*—Manabu Kanesaka

(57) ABSTRACT

The invention relates to a method for determining the instantaneous rate of the mass flow of a flow of a fluid pulsating periodically at a frequency f, said method comprising the following steps: a) a pressure gradient in the flow over a certain period (P) is determined, b) the harmonic amplitude of the pressure gradient is calculated by means of Fourier transformation, c) the frequency f and the time t are converted into dimensionless numbers F, t and d) the rate of the mass flow is determined using a table from which at least one corresponding value describing the mass flow rate and/or a phase difference can be deduced for each dimensionless number F of the frequency f.

24 Claims, 5 Drawing Sheets

METHOD AND DEVICE FOR DETERMINING THE INSTANTANEOUS MASS FLOW OF PULSATING FLOWS

BACKGROUND OF THE INVENTION AND RELATED ART STATEMENT

The invention relates to a method and a device for the determination of the instantaneous mass flow with pulsating flows.

An analytical solution for any pulsating flows is known from Uchida, S. 1956, "The Pulsating Viscous Flow Superposed on the Steady Laminar Motion of Incompressible Fluid in a Circular Pipe," J. Appl. Mat. Phys. (ZAMP), Vol. 7, pp. 403-422.

Durst et al., "Measurement of Instantaneous Flow Rates in Periodically Operating Injection Systems" Experiments in Fluids 20 (1996), pp. 178-188 has shown that the analytical solution of Uchida for the measurement of the velocity of the pulsating flow in the axis of a pipe via Laser Doppler Anemometry (LDA) can be used. A measuring method based on these findings is, for example, also described in U.S. Pat. No. 6,510,842 B2.—However, the methods which are based on the principle of LDA are also disadvantageous in several respects. The analytical solution contains Bessel functions whose solution requires a high degree of computation work in actual practice. A continuous measurement of a periodically pulsating flow is not possible with this. The provision of a device for the performance of the LDA is expensive. Apart from this, such a device is sensitive, in particular sensitive to oscillations, and is not suitable for the control or regulation of injection devices for motor vehicles.

Ray S., et al., 2005, "Mass Flow Rate Controlled Fully Developed Laminar Pulsating Pipe Flows," Journal of Fluids Engineering, Vol. 127, pp. 1-13 discloses a further analytical solution using dimensionless numbers. This can be used to avoid the time-consuming calculation of the Bessel functions.

Object of the invention is to eliminate the disadvantages as per the state of technology. In particular, a method and a device are to be specified with which the instantaneous mass flow of periodically pulsating flows can be determined with an improved time-resolution. In accordance with a further goal of the invention, the method is to be accomplishable with a device being as robust and inexpensive as possible. In particular, continuous measurement of periodically oscillating flows such as occur with injection units for motor vehicles is to be possible.

This object is solved by the features of claims 1 and 11. Useful embodiments of the invention result from the features of claims 2 to 10 and 12 to 24.

SUMMARY OF THE INVENTION

According to the invention, a method for the determination of the instantaneous rate of the mass flow of a periodically pulsating flow of a fluid at a frequency f is provided comprising the following steps:

a) determination of a pressure gradient prevailing in the flow during one period, b) calculation of the harmonic amplitude of the pressure gradient using Fourier transformation, c) conversion of the frequency f and the time t into dimensionless numbers F, τ and d) determination of the rate of the mass flow using a table from which at least one corresponding value describing the rate of the mass flow and/or a phase difference can be taken for every dimensionless number F of the frequency f.

The suggested method makes possible quick and exact determination of the instantaneous rate of the mass flow of a fluid or a liquid. The suggested method permits determination of the instantaneous rate of the mass flow with an extremely high time resolution. In particular, the mass flow of the fuel for injection units of motor vehicles can be measured exactly for each injection procedure. This makes precise control of the injection procedure possible. This can improve the efficiency of an engine and prevent undesired incomplete combustion of fuel. In particular, the suggested method also makes possible an exact control of multiple injection procedures during one stroke. The aforementioned advantages are particularly made possible by the suggested measurement of the pressure gradient and the calculating steps which are quickly accomplishable with today's process computers using the table. The suggested measurement of the pressure gradient makes possible—in contrast to the known optical methods in accordance with the state of technology—a continuous determination of the instantaneous rate of the mass flow of the fluid during one and the same period.

In accordance with an advantageous embodiment, steps a) to d) are repeated for each period. This makes possible a particularly exact report of the instantaneous rate of the mass flow and thus also quick control of the control elements for the control of a liquid flow based on the measured values. It is useful that at least 500, preferably at least 1000, values of the instantaneous rate of the mass flow are determined. This makes it possible, particularly for the development of nozzles or valves, to recognize the time progression of the rate of the mass flow during one period. This can be used to optimize such flow management or control elements with regard to the rate of the mass flow for pulsating flows.

In accordance with an advantageous embodiment, the instantaneous rate of the mass flow $\dot{m}$ is determined from the product of the dimensionless rate of the mass flow $\dot{m}^*$ and the mean rate of the mass flow $\dot{m}_m$, namely, $$\dot{m} = \dot{m}_m \dot{m}^*,$$

wherein $$\dot{m}^* = 1 + \sum_{n=1}^{m} |\psi_n||P^*_{en}|\exp[(2\pi n F\tau + \Delta\theta_n + \theta_{P^*_{en}})i]$$

applies to the dimensionless rate $\dot{m}^*$ of the mass flow and $$\dot{m}_m = \frac{\rho P_m \pi R^4}{8\nu}$$

applies to the mean rate $\dot{m}_m$ of the mass flow.

In this connection, it is useful that in the table suggested by the invention, there is exactly one value $\psi_n$ and exactly one value $\Delta\theta_n$ stored for every dimensionless number F of the frequency, and the dimensionless rate of the mass flow is computed by taking the values $\psi_n$ and $\Delta\theta_n$ from the table for every specified dimensionless number F.

This makes calculation of the instantaneous rate of the mass flow particularly quick.

In accordance with a further, particularly advantageous embodiment, the temperature of the fluid is measured. The kinematic viscosity of the fluid can be computed from the temperature. This makes possible a particularly exact calculation of the instantaneous rate of the mass flow even for changing fluid temperatures. The suggested method is universal.

In accordance with a further, particularly advantageous embodiment, a viscosity value is first assumed for the kinematic viscosity and then calculated exactly. In addition, the kinematic viscosity from a function of the rate of the mass flow m at the point in time t=0 can be calculated via the assumed and iteratively changed viscosity values. In this case, the kinematic viscosity can, for example, be computed from a change in algebraic sign of the rate of the mass flow m in the function.—With the aforementioned embodiment, the kinematic viscosity of the fluid is thus determined by using additionally available information during the reconstruction of the transient through flow. In particular, the information can be utilized for this that the through flow before a shutoff element opens at the outlet of the flow pipe (typically, injection valve for internal combustion engines) must necessarily be zero. Since the value of the kinematic viscosity causes a shift in the reconstructed periodic mass flow progression, a reconstructed mass flow of zero is only calculated then when the assumed viscosity value is also correct. A simple, numerical method can thus be worked out, whereby the viscosity is varied parametrically and the reconstructed through flow at a reference point in time in which it is known (e.g., zero when valve is closed) is compared with the known value. With a subsequent interpolation, the viscosity value can be computed which leads to a correctly reconstructed through flow value at the reference point in time. This viscosity value corresponds to the actually prevailing kinematic viscosity of the fluids on the measuring path.

The above described method can also be used to compute the kinematic viscosity of fluids.

The introduced device can, preferably in addition to the computed through flow progression, also determine and output the viscosity of the fluids.

Alternatively, the temperature can also be computed for a known fluid and known dependency of the kinematic viscosity on the temperature.

In accordance with a further provision of the invention, a device is provided for the determination of the instantaneous rate of the mass flow of a periodically pulsating flow of a fluid with a frequency f with aa) a means of pressure determination for the determination of a pressure gradient prevailing in the flow during one period, bb) a process computer connected with the means of pressure determination, comprising bb1) a means for calculation of the harmonic amplitude of the pressure gradient by Fourier transformation, bb2) a means for converting the frequency f and the time t into dimensionless numbers F, τ and bb3) a means for the determination of the rate of the mass flow using a table from which at least one corresponding value describing the rate of the mass flow and/or a phase difference can be taken for every dimensionless number F of the frequency.

The suggested device is robust and makes possible a quick and exact measurement of the instantaneous rate of the mass flow. It is not prone to malfunctions and can be manufactured with less effort—in comparison to the state of technology.

In accordance with an advantageous embodiment, a triggering unit is provided for starting a calculation sequence comprising the steps bb1) to bb3). Furthermore, it is useful that a flow control element is provided, preferably a valve, which can be controlled with the triggering unit. This makes a particularly simple setup of the device possible. This simultaneously ensures that, for example, a frequency of the operating times of the calculation sequences is correlated with the opening or closing times of the valve.

In accordance with a further embodiment of the invention, the means of pressure determination comprises an amplifier with an analog/digital converter connected downstream. This makes digital further processing of the measured signals possible.

The means of pressure determination can comprise a difference pressure sensor. The difference pressure sensor advantageously has a dynamic of at least 1:1.000. Alternatively, the means of pressure determination can also comprise two pressure sensors spaced from each other in the direction of flow, preferably piezo electric or piezo resistive, and a means for computing the difference pressure. In this case, the pressure sensors advantageously have a dynamic of at least 1:10.000, preferably at least 1:80.000, particularly preferred 1:100.000 or more. With the suggested difference pressure sensor or the pressure sensors it is possible to measure the instantaneous rate of the mass flow even for pulsating flows under high pressure. This enables the resolution of difference pressures in the range of 1 to 100 Pa. When the suggested means of pressure determination is used, a determination of the instantaneous rate of the mass flow is possible, particularly for injection units for engines, turbines, burners and similar.

In accordance with a further advantageous embodiment, a temperature measuring unit is provided for the measurement of the temperature of the flowing fluid. This can be a thermo element or similar, for example.

In addition, the process computer advantageously comprises a means for calculating the kinematic viscosity. The calculation of the kinematic viscosity can be performed in accordance with the aforementioned method on the basis of assumed kinematic viscosity values. Alternatively, the calculation of the kinematic viscosity can, however, also be performed on the basis of the measured temperature values. This can prevent errors caused by a change in the temperature of the fluid. The determination of the instantaneous rate of the mass flow is particularly exact.

In accordance with a further embodiment, it is provided that the means of pressure determination and, if applicable, the temperature measuring unit is/are installed in contact with the fluid, on a pipe. For example, the pipe can be a line between a pressure source, for example an injection pump, and an injection nozzle.

The means of pressure determination and, if applicable, the temperature measuring unit is/are usefully installed downstream on a pressure source provided at one end of the pipe. The flow control element is usefully provided downstream of the means of pressure determination and, if applicable, the temperature measuring unit. A nozzle, for example, can be connected downstream of the flow control element. The suggested device is particularly suitable for the exact control of the mass flow for injection units.

BRIEF DESCRIPTION OF THE DRAWINGS

The theoretical fundamentals of the method provided by the invention as well as examples will now be discussed in more detail based on the drawing. The figures are listed below.

DETAILED DESCRIPTION OF THE PREFERRED EMBODIMENTS

Figure 1:
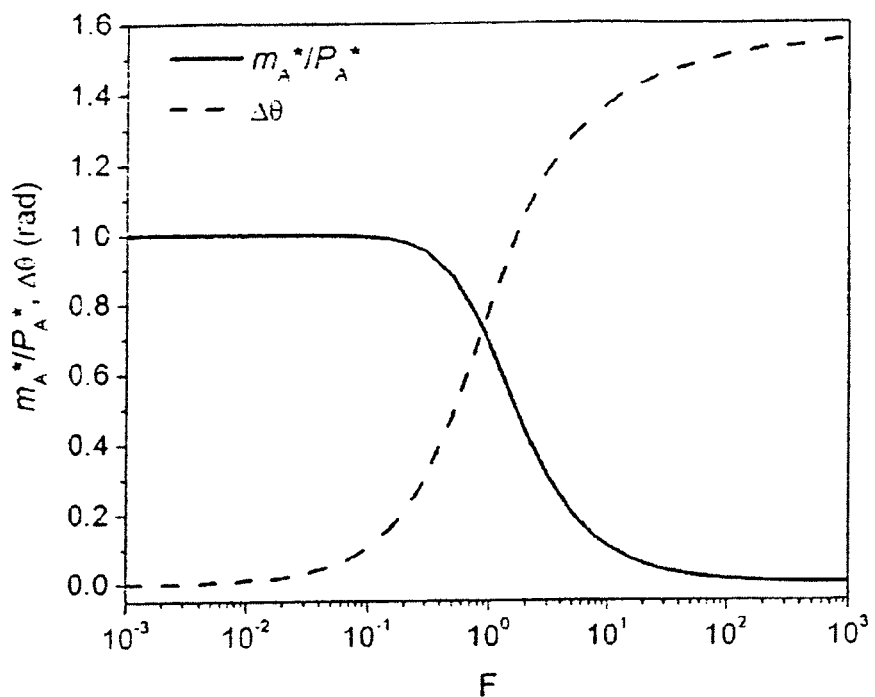
FIG. 1 The standardized amplitude ratio and the phase difference between mass flow and pressure gradient oscillations as function of the dimensionless frequency, FIG. 2a The amplitude ratio above the dimensionless frequency, FIG. 2b The phase shift above the dimensionless frequency, FIG. 3 The rate of the mass flow at the point in time t=0 via the assumed values of the kinematic viscosity ν, FIG. 4 A schematic presentation of a measuring device, FIG. 5 Measured pressure progressions for one period measured on the sensors as per FIG. 3, FIG. 6 The pressure gradient above the time, calculated on the basis of the pressure progressions as per FIG. 4, FIG. 7 The rate of the mass flow above the time, calculated on the basis of the pressure gradient as per FIG. 5 and FIG. 8 A flow diagram with the essential calculation steps.

The theoretical fundamentals of the claimed method will now be discussed in more detail.

The equation derived from Lambossy (Lambossy, P. (1952), Oscillations forcées d'un liquide incompressible et visqueux dans un tube rigide et horizontal. Calcul de la force frottement, Helv. Physica Acta 25, 371-386) for the velocity field of a harmonically oscillating, fully developed laminar pipe flow can be expanded for any variable-time pressure gradient which can be expressed with the following Fourier series $$\frac{\partial P}{\partial z} = -\rho \left[ p_0 + \sum_{n=1}^{\infty} (p_n e^{in\omega t} + C.C.) \right] \quad (1)$$

wherein C.C. stands for the complex conjugating argument. The laminar pipe flow can be described with the aid of a simplified form of the Navier-Stokes equations:

$$\rho \frac{\partial U}{\partial t} = -\frac{\partial P}{\partial z} + \mu \left( \frac{1}{r} \frac{\partial}{\partial r} \left( r \frac{\partial U}{\partial r} \right) \right) \quad (2)$$

By using the pressure gradient ($\partial P/\partial z$) from equation (1) in equation (2) one obtains a partial differential equation which describes the velocity field. The linearity of this equation permits the resulting velocity field to be calculated by a superposition of the Lambossy equations as the solution for the harmonic case which equations are used in the summands of all n terms of the pressure gradient:

$$U(r,t) = \quad (3)$$

$$-\frac{R^2 p_0}{4\nu}\left[1-\left(\frac{r}{R}\right)^2\right] + \sum_{n=1}^{\infty}\left\{\frac{p_n}{n\omega}ie^{in\omega t}\left[\frac{J_0\left(i^{3/2}Ta_n\frac{r}{R}\right)}{J_0(i^{3/2}Ta_n)}-1\right]+C.C.\right\}$$

This equation contains the Taylor number $Ta_n$ of the n-th harmonic oscillation, whereby the obtained velocity profile is defined for each subfrequency. The Taylor number $Ta_n$ is defined as follows:

$$Ta_n = R\sqrt{\frac{\omega n}{\nu}} \quad (4)$$

The pressure gradient of a pulsating flow can be expressed in the following general form as Fourier series:

$$-\frac{1}{\rho}\frac{\partial P}{\partial x} = \hat{P}_0 + \sum_{n=1}^{\infty}\hat{P}_{cn}\cos(2\pi nft) + \sum_{n=1}^{\infty}\hat{P}_{sn}\sin(2\pi nft) \quad (5)$$

and in dimensionless form and with introduction of a complex pressure gradient:

$$P^* = \left(-\frac{1}{\rho}\frac{\partial P}{\partial x}\right)\bigg/\hat{P}_0 = \left[1+\sum_{n=1}^{\infty}\hat{P}_{en}^*\exp(i2\pi nF\tau)\right] \quad (6)$$

The corresponding transient velocity field corresponding to the Lambossy solution from equation 3 in complex form is:

$$U^* = \frac{U}{U_{av}} = \quad (7)$$

$$2(1-r^{*2}) - \sum_{n=1}^{\infty}\frac{4\hat{P}_{en}^*}{\pi nF}\left\{1-\frac{J_0[(2\pi nF)^{1/2}i^{3/2}r^*]}{J_0[(2\pi nF)^{1/2}i^{3/2}r^*]}\right\}\exp(i2\pi nF\tau)$$

wherein the following standardizations were made:

$$\hat{P}_{en}^* = \hat{P}_{en}/\hat{P}_0 = (\hat{P}_{cn}-i\hat{P}_{sn})/\hat{P}_0; \ U_{av}=\hat{P}_0R^2/8\nu; \ r^*=r/R;$$
$$F=R^2 f/\nu; \ \tau=\nu t/R^2 \quad (8)$$

The mass flow can be calculated in dimensionless complex form:

$$\dot{m}^* = \quad (9)$$

$$\frac{\dot{m}}{\dot{m}_{av}} = 1 - \sum_{n=1}^{\infty}\frac{4\hat{P}_{en}^* i}{\pi nF}\left\{1+\frac{2i^{1/2}J_1[(2\pi nF)^{1/2}i^{3/2}]}{(2\pi nF)^{1/2}J_0[(2\pi nF)^{1/2}i^{3/2}]}\right\}\exp(i2\pi nF\tau)$$

The standardized mass flow consists of a stationary portion and a sum of harmonic portions:

$$\dot{m}^* = 1 + \sum_{n=1}^{\infty}\dot{m}_{os,n}^* \quad (10)$$

$$\dot{m}_{os,n}^* = -\frac{4\hat{P}_{en}^*}{\pi nF}\left\{1+\frac{2i^{1/2}J_1[(2\pi nF)^{1/2}i^{3/2}]}{(2\pi nF)^{1/2}J_0[(2\pi nF)]^{1/2}i^{3/2}}\right\}\exp(i2\pi nF\tau) \quad (11)$$

By introducing a complex variable ψ which is only dependent on the dimensionless frequency F:

$$\psi_n(nF) = \frac{4}{\pi nF}\left\{1+\frac{2i^{1/2}J_1[(2\pi nF)^{1/2}i^{3/2}]}{(2\pi nF)^{1/2}J_0[(2\pi nF)^{1/2}i^{3/2}]}\right\} \quad (12)$$

the n-th harmonic of the oscillating mass flow portion can be expressed as:

$$|\dot{m}^*_{os,n}| = |\hat{P}^*_{en}||\psi_n|\sin\left[2\pi nF\tau - \tan^{-1}\left\{\left|\frac{\text{Re}(\psi_n)}{\text{Im}(\psi_n)}\right|\right\}\right] \quad (13)$$

The total standardized mass flow can then be expressed as:

$$|\dot{m}^*| = 1 + \sum_{n=1}^{\infty} |\dot{m}^*_{os,n}| = 1 + \sum_{n=1}^{\infty} |\hat{P}^*_{en}||\psi_n|\sin(2\pi nF\tau - \Delta\theta_{m,n}) \quad (14)$$

When the pressure gradient is measured and the harmonic coefficients are known in the following form through a Fourier transformation:

$$-\frac{1}{\rho}\frac{\partial P}{\partial x} = \hat{P}_0\left[1 + \sum_{n=1}^{\infty} \hat{P}^*_{en}\exp(2\pi nF\tau i)\right] \quad (15)$$

the mass flow can then be calculated as:

$$|\dot{m}^*| = 1 + \sum_{n=1}^{\infty} |\dot{m}^*_{os,n}|\sin(2\pi nF\tau - \Delta\theta_{m,n}) \quad (16)$$

wherein:

$$|\dot{m}^*_{as,n}| = \hat{P}^*_{sn}|\psi_n|, \Delta\theta_{m,n} = \tan^{-1}[|Re(\psi_n)/Im(\psi_n)|] \quad (17)$$

The values averaged over one period are required for the standardization:

$$\hat{P}_0 = \frac{8\mu\dot{m}_{av}}{\rho^2\pi R^4}, \dot{m}_{av} = \frac{\rho\hat{P}_0\pi R^4}{8v} \quad (18)$$

From the above treatment it follows that the determination of every n-th harmonic of the oscillating mass flow portion requires only that the dimensionless amplitude ratio $|\psi_n|$ and the phase difference $\Delta\theta_{m,n}$ between mass flow and pressure gradient oscillation which are a function of the dimensionless frequency F be known. This dependency of the dimensionless amplitude ratio and the phase difference on the dimensionless frequency must only be determined once and stored. The thus computed function can be used in the form of a table or a look-up table for the quick calculation of the transient mass flow of any pulsating, laminar, fully developed pipe flow when the transient progression of the pressure gradient is measured. In addition, it can be stated that only the kinematic viscosity v must be known for the determination of the transient mass flow from the pressure gradient progression whereas the density can be shortened for the calculations and is only required for a further calculation of the volume flow.

FIG. 1 shows the standardized amplitude ratio and the phase difference between mass flow and pressure gradient oscillations as the function of the dimensionless frequency.

Similarly, a velocity measurement in a certain radial position can also be used in dimensionless form for the determination of the transient through flow:

$$U^*(r^*, \tau) = \frac{U^*}{2(1 - r^{*2})} = 1 + \sum_{n=1}^{\infty} U^*_{An,r^*} \cdot \sin(2\pi F\tau + \Delta\theta_{Un}) \quad (19)$$

An amplitude ratio of the standardized velocity oscillation and the mass flow oscillation can be defined for every n-th harmonic component of the dimensionless mass flow:

$$g_n = \frac{m^*_{An}}{U^*_{An,r^*}} \quad (20)$$

as well as a phase difference $\Delta\theta_{Un}$ between the velocity and the mass flow oscillation. The standardization of the velocity can be performed with a mean velocity:

$$U_{av} = \frac{\dot{m}_{av}}{\rho\pi R^2} = \frac{\hat{P}_0 R^2}{8v} \quad (21)$$

Figure 2A:
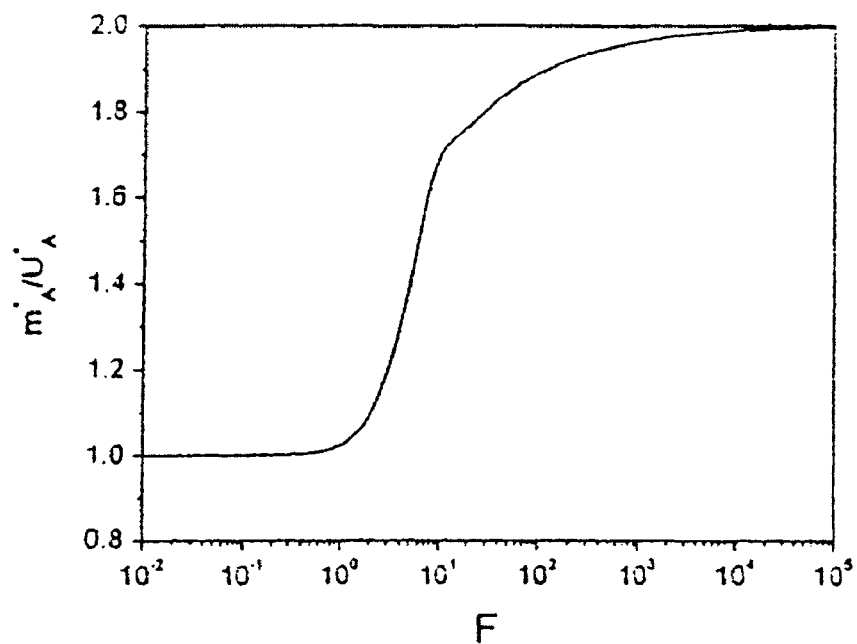
Figure 2B:
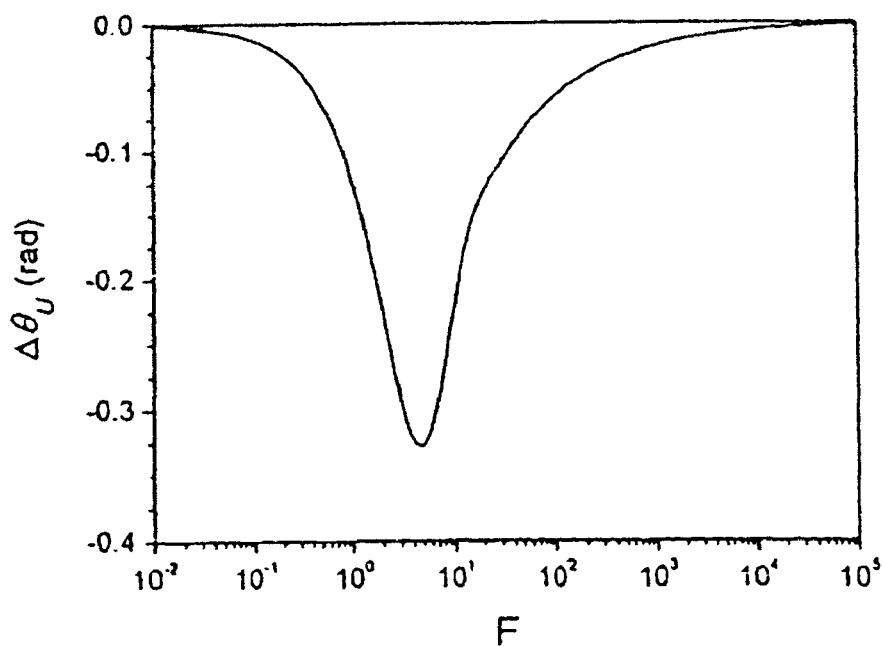

For every radial position of the velocity measurement one obtains a different function of the amplitude ratio and the phase difference above the dimensionless frequency. FIG. 2a and 2b show the progression of the amplitude ratio and the phase displacement for the axial position of the pipe above the dimensionless frequency.

A more detailed discussion of a concrete example, preferably accomplishable with a computer, of the calculation of the instantaneous rate of the mass flow follows.

1A. Pressure measurements are performed simultaneously with two pressure sensors which are located at two points along a pipe. The following applies to a single injection period:

$$P_1(t) \text{ and } P_2(t) \quad (22)$$

wherein t is the time and P is the pressure.

2A. Calculation of the pressure gradient $(\partial P/\partial x)$ for t=const. with known distance $(\Delta x)$ between the points of the pressure measurement;

$$\frac{\partial P}{\partial x} = \frac{P_2 - P_1}{\Delta x} \quad (23)$$

3A. Calculation of the mean pressure gradient $(P_m)$ for a single injection period (T=1/f), wherein T is the period and f is the frequency of the injection and these values are known from a control signal of an injection valve.

4A. Calculation of the dimensionless pressure gradient by dividing the pressure gradient by the mean pressure gradient with the dimensionless time $\tau$ and the dimensionless frequency F, as specified below:

Dimensionless pressure gradient $$P^*(\tau) = \frac{\partial P}{\partial x}\frac{1}{P_m}$$

Dimensionless time $$\tau = \frac{vt}{R^2}$$

Dimensionless frequency F:

$$F = \frac{fR^2}{v}$$

wherein R is the radius of the pipe and $v$ is the kinematic viscosity of the fluid.

5A. Quick Fourier transformation of the dimensionless pressure gradient for the calculation of the dimensionless pressure amplitudes $P^*_{en}$:

$$P^* = 1 + \sum_{n=1}^{m} P^*_{en} \exp(i 2\pi n F \tau)$$

wherein n is the summation index, $P^*_{en}$ is the dimensionless complex pressure amplitude of the component of the n-th Fourier series and m is the total number of the Fourier components which makes for a good correspondence between the measured pressure gradient and its Fourier approximation.

6A. Calculation of the dimensionless rate of the mass flow as per $$\dot{m}^* = 1 + \sum_{n=1}^{m} |\psi_n| |P^*_{en}| \exp[(2\pi n F \tau + \Delta\theta_n + \theta_{P^*_{en}})i]$$

wherein $|\psi_n|$ is the coefficient of the amplitude of the dimensionless rate of the mass flow; $\Delta\theta_n$ is the phase displacement between the pressure gradient and the rate of the mass flow and $\theta_{P^*_{en}}$ is the phase of the complex dimensionless pressure amplitude. The calculation of the unknown dimensionless rate of mass flow in the above equation can be performed by:

a. Reading the values of the coefficients $|\psi_n|$ of the amplitude of the dimensionless rate of the mass flow and the phase differences $\Delta\theta_n$ for every Fourier component nF from the look-up table from n=1 to n=m, as per $$\Delta\theta_n = \tan^{-1}\left(\left|\frac{\text{Re}(\psi_n)}{\text{Im}(\psi_n)}\right|\right)$$

A suitable look-up table can be designed as shown below, for example:

| F | $|\psi_n|$ | $\Delta\theta_n$ |
|---|---|---|
| 0.101 | 0.994110426947300000 | 0.1053313449969 |
| 0.102 | 0.993994295883800000 | 0.1063655392633 |
| 0.103 | 0.993877062667400000 | 0.1073994792126 |
| 0.104 | 0.993758728507600000 | 0.1084331624747 |
| . | . | . |
| . | . | . |
| . | . | . |

-continued

| F | $|\psi_n|$ | $\Delta\theta_n$ |
|---|---|---|
| 997000 | 0.000001276349367634 | 1.5702311293654 |
| 998000 | 0.000001275070821496 | 1.5702314126814 |
| 999000 | 0.000001273794834468 | 1.5702316955718 |
| 1000000 | 0.000001272521398875 | 1.5702319780377 | b. Calculating $\theta_{P^*_{en}}$ from the known $P^*_{en}$ for each Fourier component nF from the look-up table from n=1 to n=m as per:

$$\theta_{P^*_{en}} = \tan^{-1}\left(\left|\frac{\text{Re}(P^*_{en})}{\text{Im}(P^*_{en})}\right|\right)$$

7A. Calculation of the mean rate of the mass flow $\dot{m}_m$ which is calculated from the mean pressure gradient $(P_m)$ as per:

$$\dot{m}_m = \frac{\rho P_m \pi R^4}{8v}$$

8A. Conversion of the dimensionless rate of the mass flow $\dot{m}^*$ into a dimensionless rate of the mass flow $\dot{m}$ by multiplication with the mean rate of the mass flow as per:

$$\dot{m} = \dot{m}_m \dot{m}^*$$

Based on the above calculation method, it is possible to exactly calculate the kinematic viscosity, for example, with the following steps:

1B. Calculation of the pressure gradient as per steps 1A to 3A.

2B. Use of an assumed value for the kinematic viscosity $v$. Such a value can be assumed with good approximation if the fluid is known.

3B. Calculation of the rate of the mass flow as per steps 4A to 8A.

4B. Recording of the value of the rate of the mass flow at the point in time zero $\dot{m}(t=0)$ together with the assumed value of the kinematic viscosity $v$. Recording can be accomplished by storage in a process computer.

5B. Repetition of steps 2B to 4B with changed assumed values for the kinematic viscosity until a sign in the value of $\dot{m}(i=0)$ changes.

Figure 3:
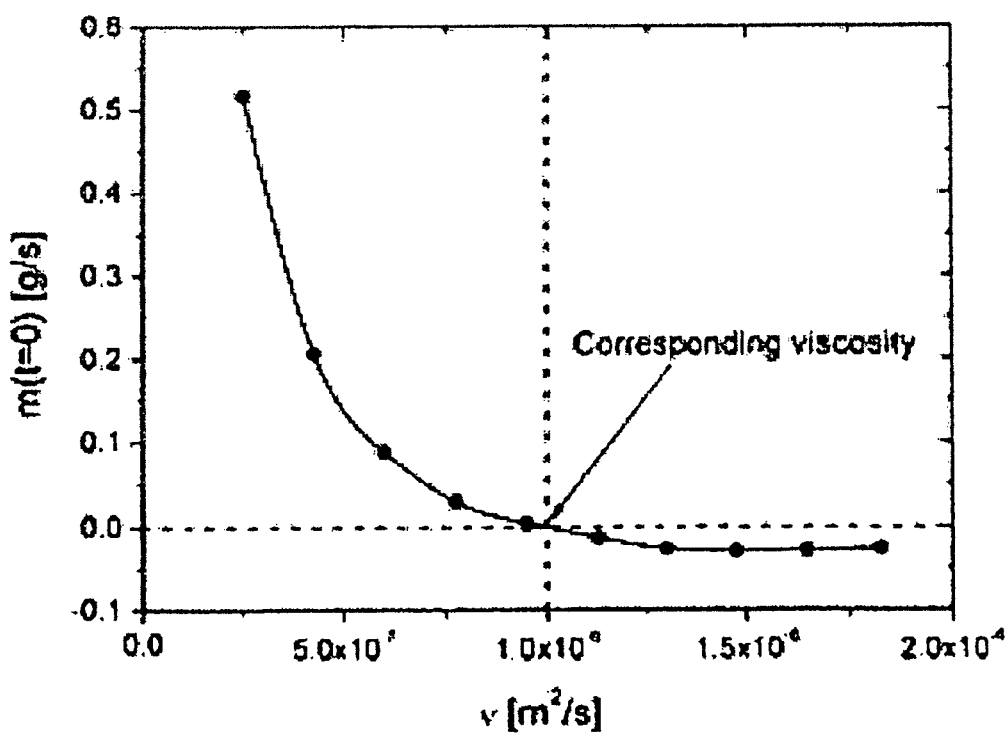

6B. Location of the kinematic viscosity $v$ by interpolation of the values assumed in step 4B. In FIG. 3 the rate of the mass flow at the point in time t=0 is applied to the assumed values for the kinematic viscosity $v$. The kinematic viscosity can be exactly computed from the change in sign of the values for the rate of the mass flow.

In summary, it can be said that an evaluation method can be constructed from the above analytical treatment which can use the one-time calculated dimensionless phase difference and amplitude ratios as a function of a dimensionless frequency in the form of a look-up table and which is able to obtain the time-dependent through flows, for example with injection valves, almost as if "online." The through flow can be reconstructed in any fixed radial position either by a measurement of the transient pressure gradient or also the velocity progression. In the first case, the mass flow can be directly reconstructed while, in the second case, primarily the volume flow and, if the density of the fluid is known, also the mass flow can be reconstructed.

Thus, the velocity progression during one period can also be measured in step a) instead of the pressure gradient. This can be accomplished using conventional methods and the LDA principle.

Figure 4:
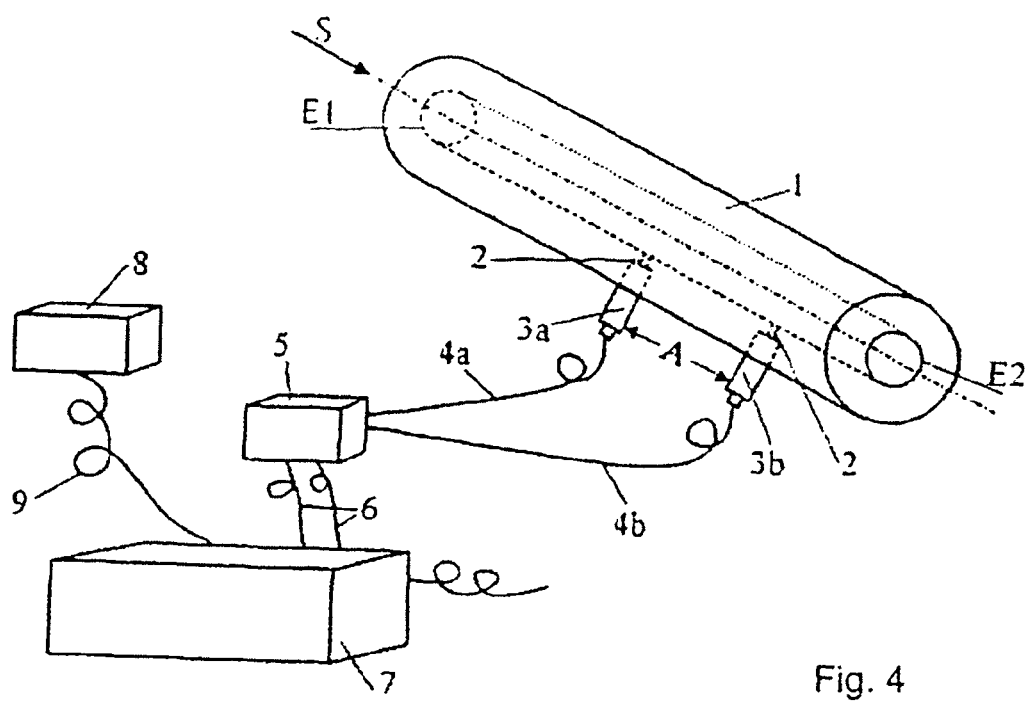

FIG. 4 shows a schematic presentation of the essential components of a suitable device for performance of the method. The jacket of a pipe 1 has two breakthroughs 2 which are provided in a flow direction S at a distance A from each other. A first end is designated with the reference sign E1 and a second end of the pipe 1 is designated with the reference sign E2. The breakthroughs 2 are tightly closed with piezo electrical pressure sensors 3a, 3b secured therein. The pressure sensors 3a, 3b usefully have a dynamic range of 1:100.000. They are connected via first cables 4a, 4b to an amplifier 5 which amplifies the charging signals generated by the pressure sensors 3a,3b and then digitalizes them with an analog/digital converter (not shown here).

The amplifier 5 is connected via second cables 6 with a process computer, in particular a computer 7. A control device or a trigger which is also connected with third cables 9 with the computer 7 is designated with the reference designator 8. Moreover, the control device 8 can be connected with a valve (not shown here) with which the second end E2 of the pipe 1 can be periodically opened and closed.

Figure 5:
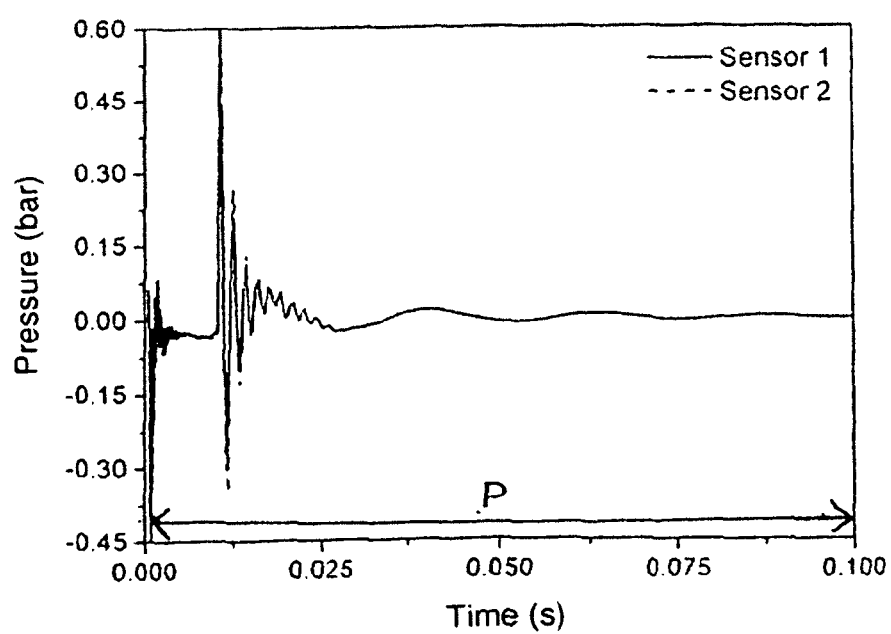

FIG. 5 shows the pressure signals delivered above the time by the pressure sensors 3a, 3b during a period P. During the period P, the pressure signals showed a (hardly perceptible here) difference.

Figure 6:
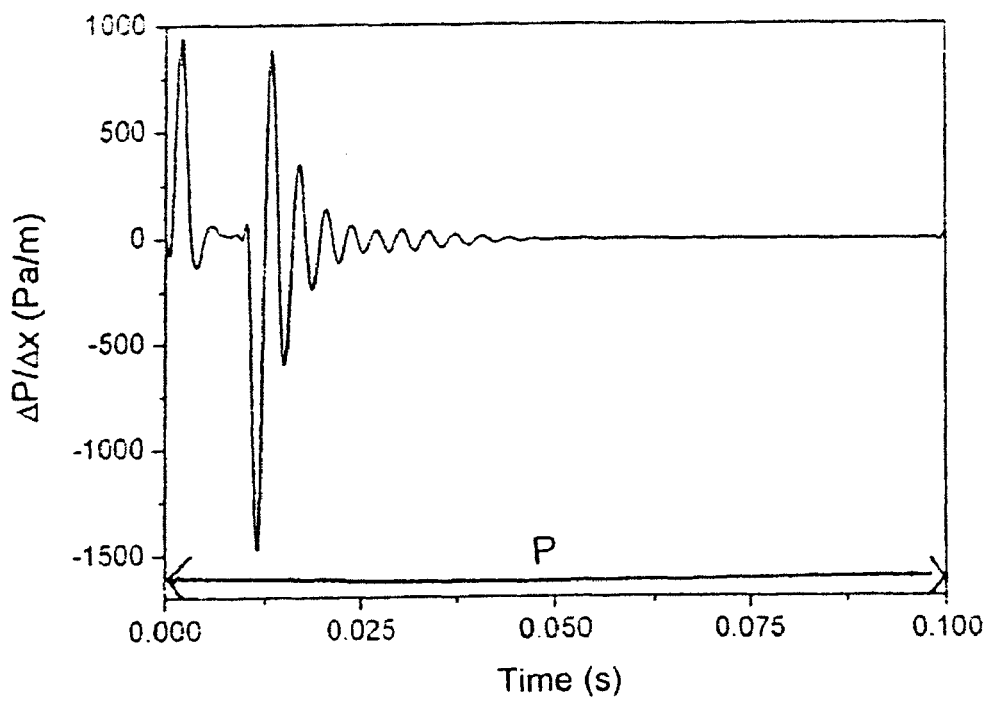

FIG. 6 shows the progression of the difference pressure gradient above the time.

Figure 7:
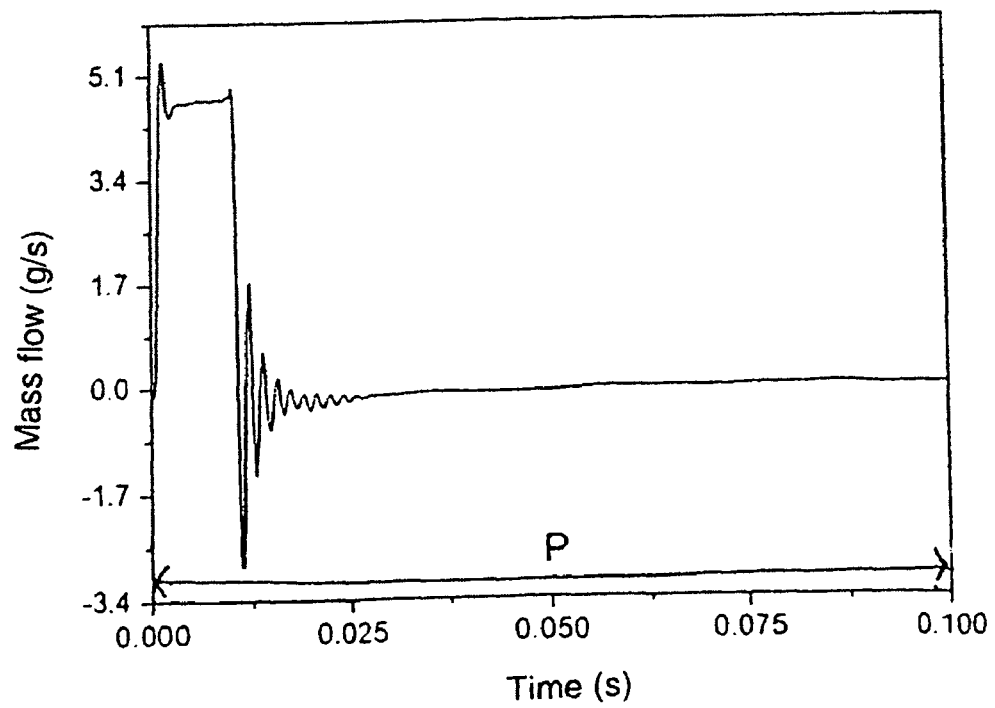

Finally, FIG. 7 shows the rate of the mass flow above the time for one period P as computed by the method provided by the invention.

Figure 8:
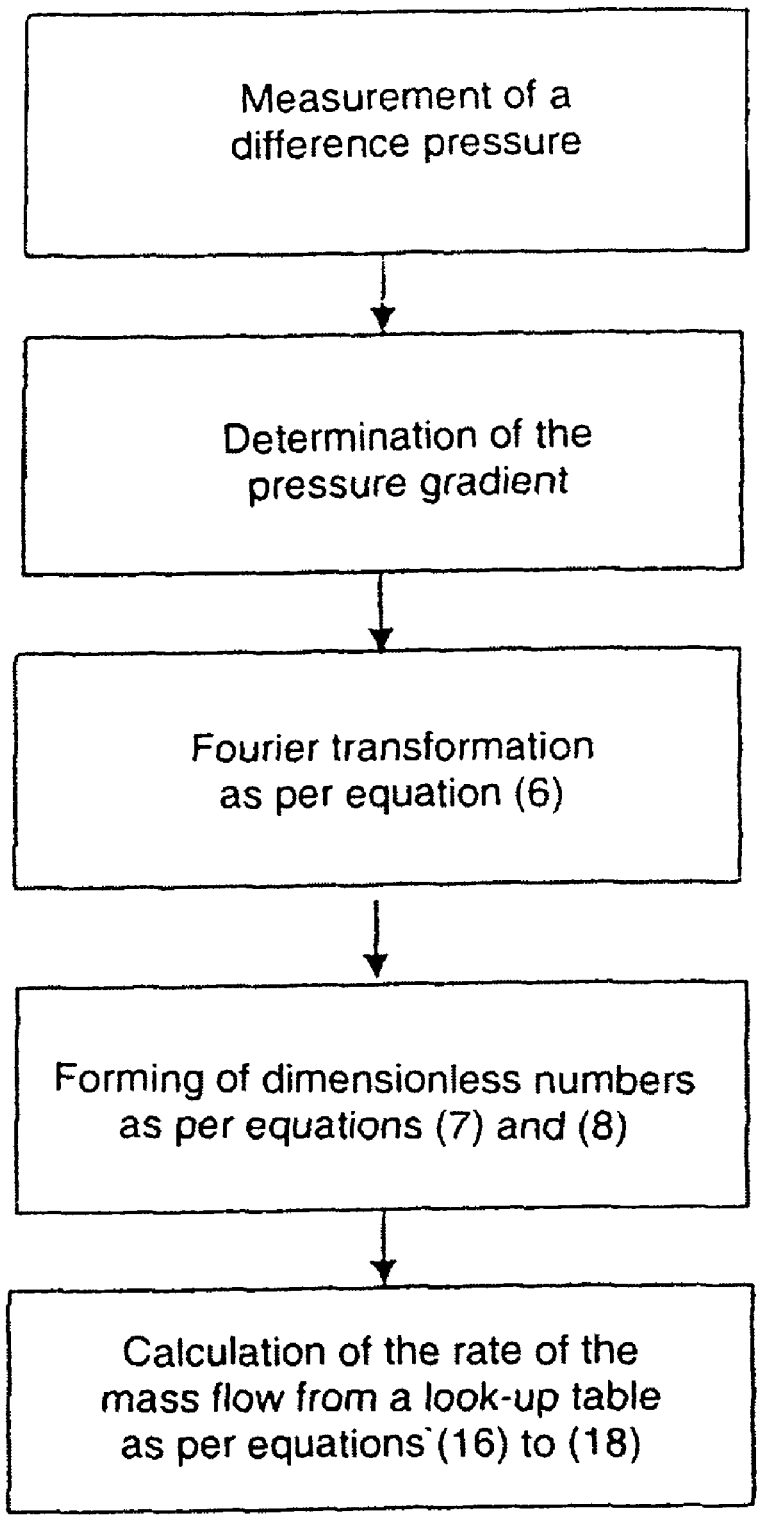

The essential method steps of the method provided by the invention are summarized again in FIG. 8. The measurement of the difference pressure can be accomplished with two pressure sensors 3a, 3b, for example. The difference pressure can be computed from the measured pressure values. However, it is also possible to use one difference pressure sensor to measure the difference pressure instead of two pressure sensors 3a, 3b.

In a next step, the pressure gradient is computed arithmetically from the difference pressure. Using the pressure gradient, the rate of the mass flow is then calculated using a look-up table based on the previously discussed, theoretical approaches. Insofar, reference is particularly made to the equations (6) to (18). The calculation requires a relatively small amount of computation and can thus be accomplished quickly enough with a process computer 7 so that continuous measurement of the instantaneous mass flow of a pulsating, flowing liquid is possible.

REFERENCE SIGN LIST

1 Pipe
2 Breakthrough
3a, 3b Pressure sensor
4a, 4b First cable
5 Amplifier
6 Second cable
7 Computer
8 Triggering device
9 Third cable
A Distance
E1 First end
E2 Second end
Period
S Direction of flow

The invention claimed is:

1. A method for the determination of the instantaneous rate of the mass flow of a periodically pulsating flow of a fluid at a frequency f comprising the following steps:
   a) Determination of a pressure gradient prevailing in the flow during one period (P),
   b) Calculation of the harmonic amplitude of the pressure gradient using Fourier transformation,
   c) Conversion of the frequency f and the time t into dimensionless numbers F, τ and
   d) Determination of the rate of the mass flow using a table from which at least one corresponding value describing the rate of the mass flow and/or a phase difference can be taken for every dimensionless number F of the frequency f.

2. The method as defined in claim 1, wherein the steps a) to d) are repeated for each period (P).

3. The method as defined in claim 1, wherein at least 500 values of the instantaneous rate of the mass flow are determined during one period (P).

4. The method as defined claim 1, wherein the instantaneous rate of the mass flow m is determined from the product of the dimensionless rate of the mass flow and the mean rate of the mass flow, $$\dot{m} = \dot{m}_m \dot{m}^*$$

wherein:

$$\dot{m}^* = 1 + \sum_{n=1}^{m} |\psi_n||P^*_{en}|\exp[(2\pi nF\tau + \Delta\theta_n + \theta_{P^*_{en}})i]$$

applies to the dimensionless rate of the mass flow and:

$$\dot{m}_m = \frac{\rho P_m \pi R^4}{8\nu}$$

applies to the mean rate of the mass flow.

5. The method as defined in claim 1, wherein exactly one value $\psi_n$ and exactly one value $\Delta\theta_n$ is stored for every dimensionless number F of the frequency, and the dimensionless rate of the mass flow is computed by taking the values $\psi_n$ and $\Delta\theta_n$ from the table for every specified dimensionless number F.

6. The method as defined in claim 1, wherein the temperature of the fluid is measured.

7. The method as defined in claim 1, wherein a kinematic viscosity of the fluid is computed from the temperature.

8. The method as defined in claim 1, wherein a viscosity value is first assumed for the kinematic viscosity and then exactly calculated.

9. The method as defined in claim 1, wherein the kinematic viscosity is calculated from a function of the rate of the mass flow m at the point in time t=0 via the assumed and iteratively changed viscosity values.

10. The method as defined in the claim 1, wherein the kinematic viscosity is computed from a change in algebraic sign of the rate of the mass flow in the function.

11. A device for the determination of the instantaneous rate of the mass flow of a flow of a fluid pulsating periodically at a frequency f, comprising:

aa) a means of pressure determination (3a, 3b) for the determination of a pressure gradient prevailing in the flow during one period (P), bb) a process computer (7) connected to the means of pressure determination (3a, 3b), comprising bb1) a means for determination of the harmonic amplitude of the pressure gradient using Fourier transformation, bb2) a means for conversion of the frequency f and the time t into dimensionless numbers F, $\tau 0$ and bb3) a means for determination of the rate of the mass flow using a table from which at least one corresponding value describing the rate of mass flow and/or a phase difference can be taken for every dimensionless number F of the frequency.

12. The device as defined in claim 11, wherein a triggering unit (8) for starting a calculation sequence comprising the steps bb1) to bb3) is provided.

13. The device as defined in claim 11, wherein a flow control element which can be controlled with the triggering unit (8) is provided.

14. The device as defined in claim 11, wherein the means of pressure determination (3a, 3b) comprises an amplifier (5) with analog/digital converter connected downstream.

15. The device as defined in claim 11, wherein the means of pressure determination (3a, 3b) comprises a difference pressure sensor.

16. The device as defined in claim 11, wherein the difference pressure sensor has a dynamic of at least 1:1.000.

17. The device as defined in claim 11, wherein the means of pressure determination (3a, 3b) comprises two piezo electrical or piezo resistive pressure sensors (3a, 3b) spaced from each other in the direction of the flow, and a means of computing the difference pressure.

18. The device as defined in claim 17, wherein the pressure sensors (3a, 3b) have a dynamic of at least 1:10.000.

19. The device as defined in claim 11, wherein a temperature measuring unit for measuring the temperature of a flowing fluid is provided.

20. The device as defined in claim 11, wherein the process computer (7) comprises a means for calculating a kinematic viscosity.

21. The device as defined in claim 20, wherein the calculation of the kinematic viscosity is based on the measured temperature values.

22. The device as defined in claim 11, wherein the means of pressure determination (3a, 3b) and, if applicable, the temperature measuring unit is/are installed in contact with the fluid on a pipe (1).

23. The device as defined in claim 11, wherein the means of pressure determination (3a, 3b) and, if applicable, the temperature measuring unit is/are provided downstream of a pressure source provided on one end (El) of the pipe (1).

24. The device as defined in claim 11, wherein the flow control element is provided downstream of the means of pressure determination (3a, 3b) and, if applicable, the temperature measuring unit.

* * * * *